April 18, 1939.  R. L. LEVY  2,154,984
SELF-FOLDING STRUT FOR AIRPLANE LANDING CHASSIS
Filed April 2, 1937  2 Sheets-Sheet 1
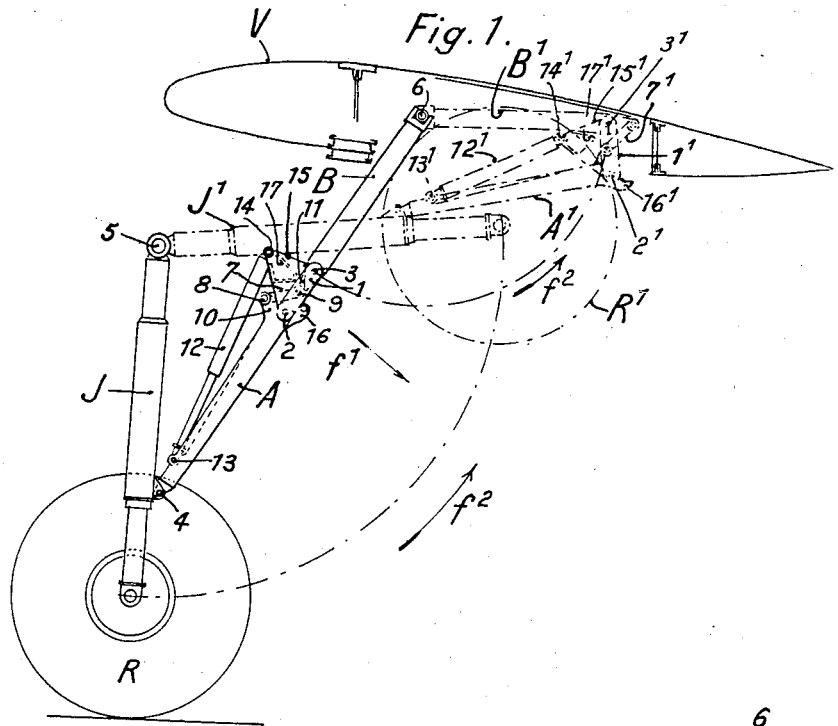
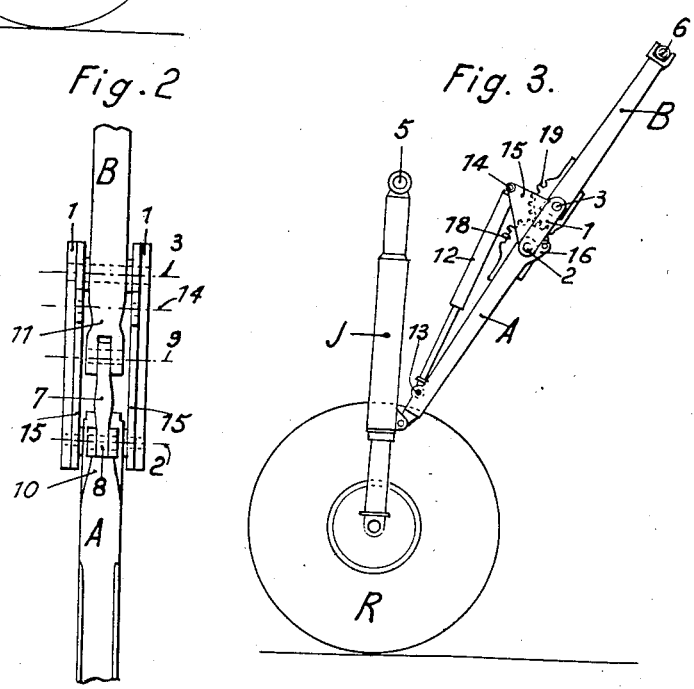
R. L. Levy
Inventor
By Glascock Downing & Seebold
Attys.

April 18, 1939.    R. L. LEVY    2,154,984
SELF-FOLDING STRUT FOR AIRPLANE LANDING CHASSIS
Filed April 2, 1937    2 Sheets-Sheet 2
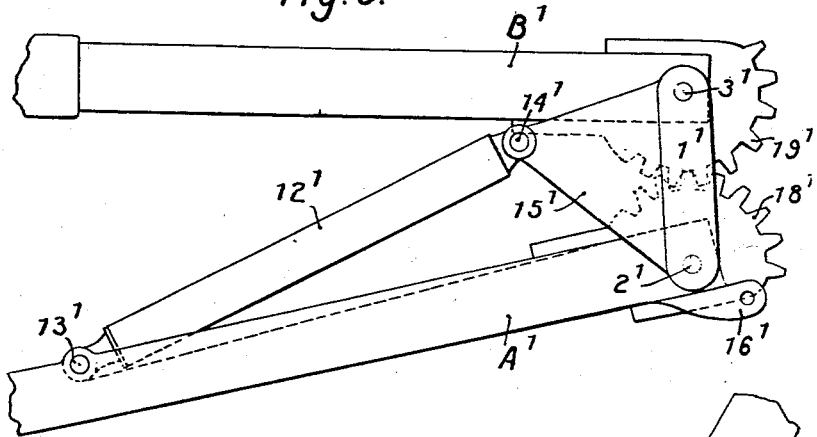
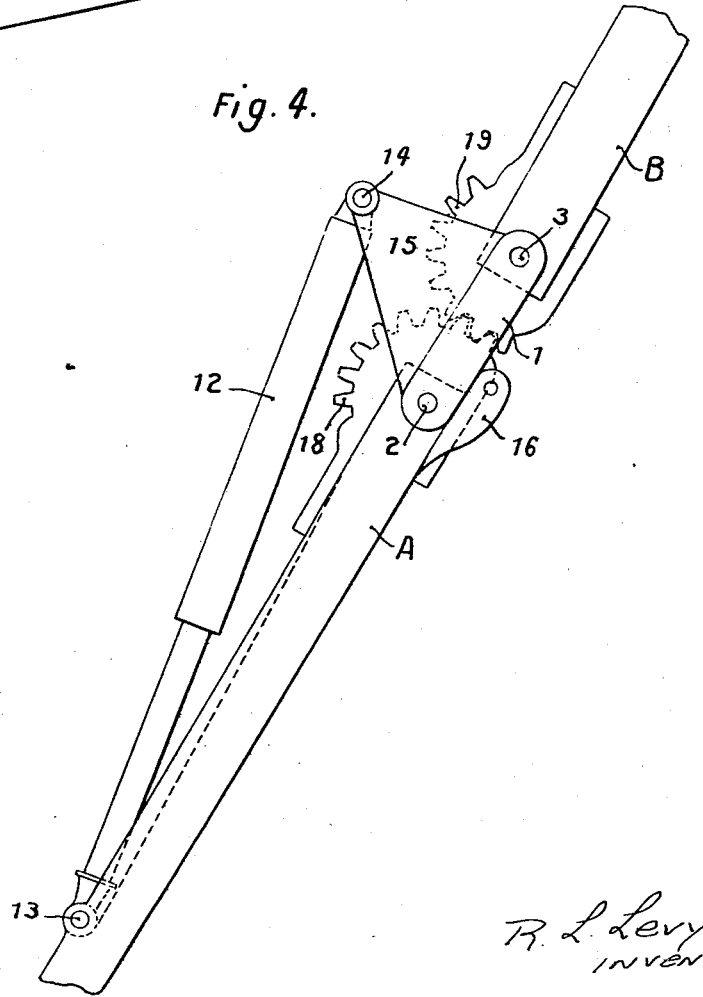

Patented Apr. 18, 1939

2,154,984

UNITED STATES PATENT OFFICE 2,154,984

SELF-FOLDING STRUT FOR AIRPLANE LANDING CHASSIS

René Lucien Levy, Montrouge, France, assignor to Société d'Inventions Aéronautiques et Mécaniques S. I. A. M., Fribourg, Switzerland Application April 2, 1937, Serial No. 134,641
In France May 26, 1936

4 Claims. (Cl. 244—102)

This invention relates to retractable landing chassis for airplanes, and it concerns a so-called "self-folding" strut, in this sense that it has the property of folding or of coming in extended position by a stress which is developed within the device itself, that is to say without this stress taking a bearing on the airplane.

The retractable system, in which this self-folding strut intervenes, is connected to the airplane by only two fixed points about which it can rock, the distortion of the self-folding strut, by a stress within the latter, having for effect to determine this rocking movement or oscillation in one direction or the other.

The self-folding strut is essentially constituted by two elements pivotally connected by a third and so-called "coupling element", the relative movements of the two extreme elements, relatively to the coupling element, being governed by a suitable kinematic law, this unit being, moreover, combined with any driving member (pneumatic, electric, hydraulic member, sandow, etc.) carried by the self-folding strut and taking a bearing on one of the elements for engaging with one of the two other elements, in order to determine either the folding or the extension of the strut.

The two extreme elements are pivoted, one to a fixed point of the airplane, the other to a point of the landing chassis which is to be retracted.

In the embodiments described hereinafter, the kinematic law governing the displacements of the extreme elements is realized by means of links, or gears, but the invention extends, of course, to the use of any other equivalent means.

In the accompanying drawings:

Fig. 1 is a side elevation showing a first embodiment of the invention.

Fig. 2 illustrates, on an enlarged scale, the members for connecting together the two elements of the self-folding strut, at the folding point.

Fig. 3 is a side elevation showing a modification.

Figs. 4 and 5 are partial views corresponding to the preceding one, the first showing the strut in extended position, and the second showing said strut in folded position.

Referring to the example illustrated in Figs. 1 and 2, it will be seen that the self-folding strut is constituted by two elements A—B connected by a coupling element constituted herein by a link, or a pair of links, 1—1, on which the elements A—B are pivoted at 2—3.

At its end opposed to the coupling element, the element A is pivoted at 4 on the carrying strut J of the wheel R. This strut J, which is provided for instance with a shock absorber, can pivot about a fixed pin 5 on the airplane.

This element B of the self-folding strut can pivot about a pin 6, also fixed on the airplane V.

The pins 5—6 constitute the only two solid points through which the wheel and its retracting system are connected to the airplane.

The kinematic law which co-ordinates the movements of the elements A—B is enforced by a link 7 which is pivoted, on the one hand, at 8, on a boss 10 of the element A, and on the other hand, at 9, on an extension 11 of the element B.

The driving element, arranged within the retracting device, is constituted, in this embodiment, by a jack 12 which bears, on one side, on a joint 13 of the element A, and, on the other side, engages, through a joint 14, with a double triangle 15—15, rigid with the coupling member 1—1.

In the extended position illustrated in full lines in Fig. 1, the system cannot accidentally open, as the jack 12 prevents any displacement corresponding to the folding of the strut A—B in one direction or the other.

By causing retraction of the jack 12 (operating, for instance, hydraulically) the strut is caused to fold, according to the arrow $f^1$, by angular displacement of the elements A—B about the pivot pins 2—3, which themselves are movable in space.

Simultaneously, the element B pivots about the fixed point 6 and the carrying strut J pivots about the fixed point 5, according to the arrows $f^2$, so that, when the movement of retraction is terminated, the articulated device has come to the position illustrated in dot and dash lines in Fig. 1.

For this position, the index 1 is added to the reference numbers and letters designating the various parts or members.

It is to be noted that, in the extended position of the strut, the links 1—1 bear against an abutment member 16 provided on the element A. Likewise, in the retracted position, the arm $B^1$ rests on a bearing member $17^1$ rigid with the triangle $15^1$—$15^1$.

In the example of Figs. 3 to 5, the interdependency of the movements of the two elements A—B of the self-folding strut is ensured, no longer by the link 7, but by toothed wheels 18—19, meshing together and rotating on the pins 2—3, the links 1—1 connecting, as previously, the two extreme elements of the strut.

What I claim as my invention and desire to secure by Letters Patent is:

1. A retractable landing chassis for airplanes comprising a carrying strut, a pivotal connection between said strut and a fixed point of the airplane, a self-folding strut including two outer elements and a third coupling element, a separate pivotal connection between each of the two outer elements and said coupling element, means pivotally connecting one end of the self-folding strut to said carrying strut, means pivotally connecting the opposite end of said strut to a fixed point of the airplane, an expansible driving member separate from each of the three elements of the strut and pivotally connected at one end to one of said elements and at the other end to another of said elements, and means separate from said expansible driving member whereby each position of one of the outer elements is caused to correspond to a definite position of the other outer element.

2. A retractable landing chassis for airplanes comprising a carrying strut, a pivotal connection between said strut and a fixed point of the airplane, a self-folding strut including two outer elements and a third coupling element, a separate pivotal connection between each of the two outer elements and said coupling element, means pivotally connecting one end of the self-folding strut to said carrying strut, means pivotally connecting the opposite end of said strut to a fixed point of the airplane, an expansible driving member separate from each of the three elements of the self-folding strut and pivotally connected at its opposite ends to said coupling element and another of the elements of said self-folding strut, and means separate from the driving member whereby each position of one of the outer members is caused to correspond to a definite position of the other outer member.

3. A retractable landing chassis for airplanes comprising a carrying strut, a pivotal connection between said strut and a fixed point of the airplane, a self-folding strut including two outer elements and a third coupling element, a separate pivotal connection between each of the two outer elements and said coupling element, means pivotally connecting one end of the self-folding strut to said carrying strut, means pivotally connecting the opposite end of said strut to a fixed point of the airplane, an expansible driving member separate from each of the three elements of the strut and pivotally connected at one end to one of said elements and at the other end to another of said elements, and a link separate from said driving member connecting the adjacent ends of the outer elements of the self-folding strut whereby each position of one of the outer elements corresponds to a definite position of the other outer element.

4. A retractable landing chassis for airplanes comprising a carrying strut, a pivotal connection between said strut and a fixed point of the airplane, a self-folding strut including two outer elements and a third coupling element, a separate pivotal connection between each of the two outer elements and said coupling element, means pivotally connecting one end of the self-folding strut to said carrying strut, means pivotally connecting the opposite end of said strut to a fixed point of the airplane, an expansible driving member separate from each of the three elements of the strut and pivotally connected at one end to one of said elements and at the other end to another of said elements, and intermeshing gear segments separate from said driving member and carried respectively by the adjacent ends of the outer elements of the self-folding strut whereby each position of one of the outer elements is caused to correspond to a definite position of the other outer element.

RENÉ LUCIEN LEVY.